March 23, 1943.  G. CLARK  2,314,607
TICKET CONTAINER FOR MILK BOTTLES
Filed Aug. 8, 1942
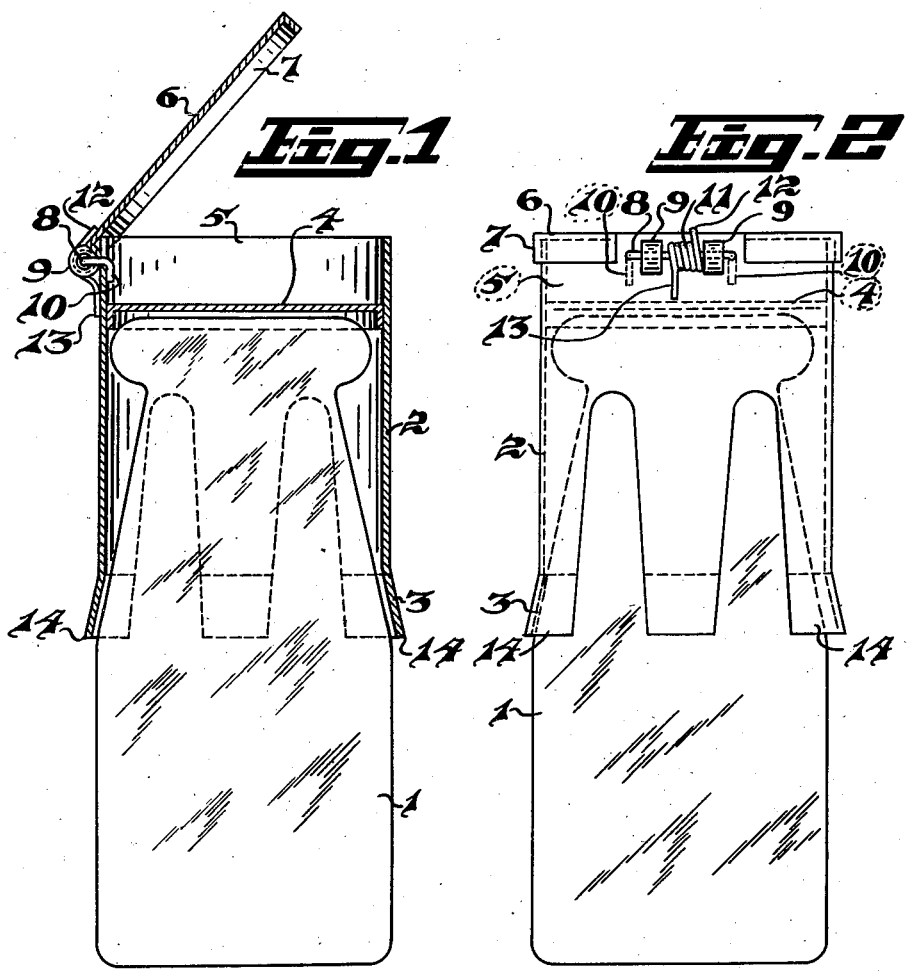
Inventor;
Gordon Clark
Per L. A. Mitchell
Attorney Patented Mar. 23, 1943

2,314,607

UNITED STATES PATENT OFFICE 2,314,607

TICKET CONTAINER FOR MILK BOTTLES

Gordon Clark, Kinsella, Alberta, Canada

Application August 8, 1942, Serial No. 454,156
In Canada April 13, 1942

2 Claims. (Cl. 215—100)

My invention relates to covers for milk bottles providing a container for tickets, coins or other tokens of payment.

In the art to which the invention relates, in the house delivery of milk, payment for the milk in tickets or coins is usually put out for the milkman and is subject to exposure to the weather with possible loss or damage. It has been proposed to provide a clip or similar means on a milk bottle cover by which the milk ticket can be attached to be picked up by the milkman.

The present invention contemplates certain improvements in the art by provision of an improved container for tickets or coins and a closure for the container by which the tickets or coins may be protected from the weather and are made readily available to the milkman.

One of the objects of the invention is accordingly to provide a cover for milk bottles to be placed on the milk bottle freely removable therefrom and including a container for tickets, coins or other tokens of payment for the milk, and including a closure for the container hinged thereto and providing protection for the contents of the container from the weather.

Other features and advantages of the invention will become apparent by reference to the accompanying description taken in conjunction with the drawing wherein like characters of reference indicate like parts throughout the different views and wherein:

Fig. 1 is a sectional view of my improved milk bottle ticket container shown as it would appear mounted on a milk bottle and with the cover open.

Fig. 2 is a rear elevation of the container similarly shown but with the cover closed.

Having reference to the drawing I indicates a milk bottle of a character in common use and on which the ticket container is designed to be mounted. The ticket container provides a cylindrical body including a skirt section 2 designed to loosely fit over the top of the bottle and including a flared portion 3 at its lower end for seating the container on the shoulder of the bottle.

Spaced from the upper end of the cylindrical body, within said body, is a partition 4 forming a bottom for the ticket compartment and serving to support the holder on the bottle in conjunction with the flared portion 3. The partition 4, in conjunction with the upper part of the cylindrical body, defines a chamber 5 in which the coins, tokens or tickets in payment for the milk may be placed.

For protection of the chamber or ticket compartment 5, I provide a cover 6 including a flanged rim 7 fitting over the upper marginal portion of the cylindrical body. The cover 6 is hinged to said body by a hinge pin 8 that is loosely engaged by spaced apart integral hinge members 9. The pin 8 is bent adjacent both ends right angular to the body of the pin and then bent again right angular to the bent portions to provide depending ends 10. This structure will be more readily apparent by reference to Figure 1. The body of the container provides suitable openings in which the bent end portions of the pin 8 are received. For normally holding the cover closed I provide a coiled spring 11 on the pin 8, said spring including tail memebrs 12 and 13 bearing respectively against the cover and the body of the holder to tension the spring by an opening movement of the cover and on release thereof to restore the cover to its closed position.

For more convenient fitting of the cover supported on the shoulder of the bottle I preferably form the skirt 2 with slots at intervals forming a series of sections 14. These permit a certain amount of give to the skirt making it less rigid and more easily inserted over the bottle and more effectively engaging thereon and also effect a saving of metal.

The holder provides a convenient receptacle for tickets or coins in payment for milk that protects them against the weather or from being lost and is readily accessible to the milkman. The container could be very cheaply manufactured and be a convenience in the house delivery of milk.

While I have herein disclosed a preferred embodiment of my invention is it obvious that changes would be permissible within the scope of the invention as defined by the appended claims.

What I claim and wish to secure by Letters Patent is:

1. A ticket container for milk bottles comprising an open ended cylindrical body member, a partition intermediately dividing the body member into an upper compartment for reception of tickets or coins, and a lower skirt section for mounting over the upper end of a milk bottle, said skirt section being flared at the lower end for seating on the shoulder of said bottle, a cover hinged to close the ticket compartment, and spring means normally holding said cover in closing relation to the compartment.

2. A ticket container for milk bottles comprising an open ended cylindrical body, said body providing a lower skirt section for mounting over the upper end of a milk bottle, the skirt section being flared and including longitudinal slots at intervals, a compartment in the upper end of the body for reception of tickets or coins and a hinged closure for said compartment.

GORDON CLARK.